United States Patent [19]
Lovitz et al.

[11] 3,865,082
[45] Feb. 11, 1975

[54] SMALL ANIMAL PLAYGROUND

[75] Inventors: David D. Lovitz, Short Hills, N.J.; Ness Eastman, Rego Park; William H. Davidson, Katonah, both of N.Y.

[73] Assignee: The Hartz Mountain Corporation, Harrison, N.J.

[22] Filed: Nov. 19, 1973

[21] Appl. No.: 418,281

[52] U.S. Cl. ................................... 119/17, 119/15
[51] Int. Cl. .............................................. A01k 1/00
[58] Field of Search ........................... 119/15, 17, 1

[56] References Cited
UNITED STATES PATENTS
| 3,742,908 | 7/1973 | Merino | 119/15 |
| 3,774,576 | 11/1973 | Moore | 119/17 |
| 3,791,346 | 2/1974 | Willinger et al. | 119/17 |

Primary Examiner—Hugh R. Chamblee

[57] ABSTRACT

A playground housing for small animal pets comprising a basic unit resting upon supporting means, such as a table or an underlying tank constituting a lower section. The basic unit consists of a transparent main housing member detachably secured to a base tray, said member comprising a central chamber, a peripheral tunnel and medial channels communicating between said tunnel and chamber, said tray having a central portion constituting the floor of said chamber. A cylindrical tower with an internal helical climbing ledge is adapted to be releasably attached to a selected one of several apertured portions in the central chamber and tunnel at a desired level. Interchangeable closures are used with said apertured portions, and ventilating openings are provided in said closures and other portions of the device. A feeder is adapted for suspension from said tower.

12 Claims, 12 Drawing Figures

SMALL ANIMAL PLAYGROUND

BACKGROUND OF THE INVENTION

1. The Field of the Invention

This invention relates to housings for small animals such as hamsters and gerbils, and is particularly directed to housings adapted for use as playgrounds for such animals.

2. The Known Art

Conventional housings for hamsters and gerbils are no more than cages providing confined and limited space for movement and with no room or inducements for physical activity and exercise, so that the confined animal tends to sleep more than is necessary and loses the benefits of healthy activity. It has also been found that the commonly used housings for such animals contain protruding portions which the animal is tempted to chew and nibble at — portions of such cages, particularly when made of plastic material, being at times eaten away and forming escape holes; and it has also been found that where the cage contains sharp metal or plastic edges, the animal is frequently injured when coming into contact therewith. Among other disadvantages of conventional hamster and gerbil housings are the need for handling messy and soiled litter when cleaning the cage, and inadequate means for supporting feeding bottles. Another serious drawback of conventional cage-like housings is the utter absence of play appeal for pet-loving children, since such housings are fixed in configuration and cannot be modified by attachable components. In attempts to provide play appeal and add extended areas for movement of the animal, housings have been supplied with tubular members communicating with the main housing portion, but such expedients have proven unsatisfactory for various reasons and especially because the tubular members provide a concave and hence insecure underfooting for the animal. Devices of the last-mentioned category at times include a vertical passageway leading to an upper chamber, but these have the disadvantage of employing parallel spaced rungs to enable the animal to climb upwardly, requiring the use of considerable reach and effort for an upward climb and thereby discouraging the animal from its use. Among other disadvantages and shortcomings of known devices are the absence of sufficient vents, often causing suffocation.

OBJECTIVES OF THIS INVENTION

It is the objective of this invention to provide a useful and attractive playground housing for small animals such as hamsters and gerbils that has none of the shortcomings above mentioned. More specifically, among the objects of this invention are the following: the provision in a housing of the above-mentioned category of extended play areas for the animal, including channels or tunnels with relatively flat underfootings and offering play inducement for the animal; the provision of means for using the main or basic playground unit in conjunction with an underlying aquarium or terrarium serving both as a support for the basic unit and as a lower housing section; the provision of separable and reattachable components that constitute the aspect of play appeal for children; the elimination of all protruding elements, corners and metal edges, thereby to obviate the danger of a nibbling away of portions of the device or injury to the animal; the provision of simple means of cleaning the device and eliminating the need for manual handling of soiled litter; the provision of means to attach a feeding bottle for use in various locales, such as in the main chamber, one or more of the tunnels, or the lower section; the provision of means to enable manual access to the main chamber for removing the animal for cleaning and personal attention; the provision of adequate and conveniently located vents for ventilation of all sections of the device, including the lower section when used; the provision of a vertical tower for detachable securement to various portions of the device and for selective communication with the central chamber, the tunnels, and the lower section; the provision on such tower of an internal helical ledge whereby the vertical spacing between diametrically opposite sides of the tower is sufficiently small to facilitate upward climbing; and the further provision in such tower of means to enable it to be removably attached and operatively supported at different portions of its longitudinal body, so that it could be made to extend a selected distance into the central chamber and said lower section. And it is the further objective of this invention to provide a relatively simple and inexpensive device capable of attaining the objectives hereinabove mentioned.

Other objects, features and advantages will appear from the drawings and the description hereinafter given.

SUMMARY OF THE INVENTION

The preferred form of this invention comprises a basic unit resting upon supporting means, the basic unit consisting of a main transparent housing member, preferably of plastic, detachably secured to a base tray, the latter being adapted to rest upon a support such as an underlying tank like an aquarium or terrarium or, if desired, on any flat support.

The said member comprises a central chamber, a peripheral tunnel and medial channels communicating between said tunnel and said chamber, said tray having a central portion underlying and constituting the floor of said chamber. The peripheral portion of the tray is substantially flat and depressed below its said central portion, and constitutes the floor of said peripheral tunnel, the tray having substantially flat connecting portions between its peripheral and central portions and which constitute the floor of said channels. There are open portions of said transparent housing member outside of said chamber, tunnel and channels directly above open lattice-work areas in said tray which serve as vents for an underlying supporting tank when used as a lower housing section.

Other components of said main housing member are a tubular tower releasably attachable to a selected one of several apertured portions in the roof of the central chamber, in its said floor, and in different portions of the roof of said tunnel, said apertured portions being provided with removable closures. Said tower is provided with sets of diametrically opposite outwardly extending lugs at different levels for operative attachment either to the apertured portion in the central chamber's roof or that of its floor at a selected level, so that a portion of the tower will, if desired, extend into the central chamber or the underlying tank a predetermined amount, depending upon the size of the animal or other considerations. The inner surface of the tower has a continuous path formed by a helical ledge to enable the animal to climb upwardly for play movement or to reach a feeder suspended from the top of the tower, the laterally opposite legs of the animal being capable of grasping the diametrically opposite ledge portions at the relatively short height differential of one-half the helical pitch, making for easy climbing. The preferably bellows type of feeder can be suspended directly from the roof or floor of the central chamber if the tower is not used.

The said apertured portion of the roof contains a detachable fitting for operatively receiving the tower, said fitting being removable to permit the entry of a hand for reaching into the central chamber to remove an animal therein for cleaning or other care purposes. The said fitting is also adapted to receive one of said closures to prevent the animal from escaping. The fitting, closures and tunnel are all provided with vent openings for admitting air, but too small to be penetrated by the animal's teeth or claws.

The arrangement is hence such as to provide a safe and well ventilated housing and play area of extended proportions for small animals, including, if desired, upper and lower sections, a tower positionable at different locales and different levels with convenient climbing means, thereby to provide an additional play area for the animal, feeding at convenient levels, and play appeal for a child. There are a minimum of parts for a device having said variety of arrangements — the components comprising a one-piece transparent housing, a base tray, a tower, and identical closure members for use at any one of said apertured portions; and if a lower section is desired, a standard aquarium tank can be employed.

DESCRIPTION OF PREFERRED EMBODIMENT

In the drawings, the basic unit, generally referred to by the reference numeral 15, is adapted to rest upon an underlying support, such as a table 16 (FIG. 3) or a tank member 17 (FIG. 10) providing a lower compartment, to be more fully hereinafter described. The said basic unit consists of a transparent main housing member 18, preferably of somewhat flexible plastic material, detachably secured to a base tray 19, the detachable engagement being effected by the coaction of the detent elements 20 extending upwardly and inwardly from the upper peripheral edge 21 of the said tray and the lugs 22 extending outwardly from the lower peripheral edge 23 of the transparent housing member.

The said main housing member 18 comprises a peripheral portion generally designated 24 consisting of outer walls 25, 26, 27 and 28, inner walls 29, 30, 31, 32, 33, 34, 35, 36 and top walls 37, 38, 39 and 40 defining the upper portion of the peripheral tunnel generally designated 41, the peripheral bottom portion 42 of said main housing member 18 being open and overlying the corresponding peripheral portion 43 of the tray 19 for communication therewith, as will be hereinafter described. In the center of housing member 18 is the central chamber 44 open at the bottom and laterally enclosed by the walls 45, 46, 47 and 48 and having the roof 49 with an apertured portion 50 therein to be hereinafter referred to. Connecting the said central chamber 44 with the said tunnel 41 are the channels 51 and 52 communicating between said chamber and the respective tunnel sections 41A and 41B, and the channels 53 and 54 communicating between said chamber and tunnel sections 41C and 41D. Channel 51 is defined by lateral walls 55 and 56 and top wall 57; channel 52 is defined by lateral walls 58 and 59 and top wall 60; channel 53 is defined by lateral walls 61 and 62 and top wall 63; and channel 54 is defined by lateral walls 64 and 65 and top wall 66. The respective bottom portions of said channels 51, 52, 53 and 54 are all open and overlying the peripheral portion of the tray, thereby forming passageways through said tunnels. The apertured portions 67, 68, 69 and 70 of the housing member 18 are in registry with the respective latticed vent sections 71, 72, 73 and 74 in said base tray for ventilating an underlying compartment, such as the said tank 17.

The said base tray 19 comprises a marginal peripheral wall 75 in spaced relation to the inner portion generally referred to by the reference numeral 76, the said peripheral wall 75 and the outer periphery 77 of said inner portion together defining the lower section 78 of the tunnel 41, the floor 79 of said lower portion being depressed below the level of the upper edge 21 of peripheral wall 75 and that of said inner portion 76, and being substantially flat. The arrangement is such that when the main housing member 18 is operatively positioned over the tray 19, the floor 79 will underlie the said peripheral open portion 24, thereby to complete the enclosure which forms the passageway through the tunnel 41. The said inner portion 76 of the tray has the central floor portion 80 thereof underlying the central chamber 44 of said housing member 18, thereby constituting its floor. At four corner portions of the tray are the said latticed vent sections 71, 72, 73 and 74.

Figure 11:
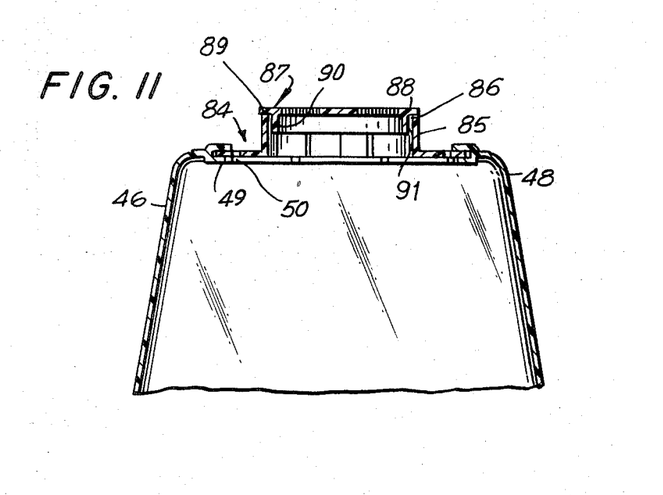
FIG. 11 is an enlarged fragmentary section of FIG. 10 taken along line 11—11.

The roof 49 of the said central chamber 44 is provided, as aforesaid, with the apertured portion 50 comprising a circular opening with peripheral bayonet means 81 for operative engagement, in known manner, with corresponding bayonet means 82 on the outer periphery of the flange 83 of the flanged fitting 84, the latter having an upwardly extending annular wall 85 with bayonet means 86 adapted for operative engagement with a closure disc 87 (FIG. 11). Said disc has a flat cover portion 88 adapted to overlie the upper edge 89 of the said annular wall 85 and a downwardly depending annular wall 90 provided with known bayonet means 91 engageable with the said bayonet means 86 on said annular wall 85.

The said transparent housing member has, in the particular form illustrated, two additional apertured portions generally designated 92 and 93, these having annular walls 94 and 95, respectively, extending upwardly from said tunnel 41 at different portions thereof and being in communication with the interior thereof. Said last-mentioned annular walls have at their respective upper peripheral edges bayonet means 96 adapted for operative connection with covers 87A and 87B identical to the cover 87 (FIG. 11) above referred to. The floor 80 of said base tray also has an apertured portion 97 with peripheral bayonet means 98 adapted for operative connection engagement with the closure 87C identical to the closure 87, 87A and 87B above mentioned (see FIG. 4).

Figures 4, 4A:
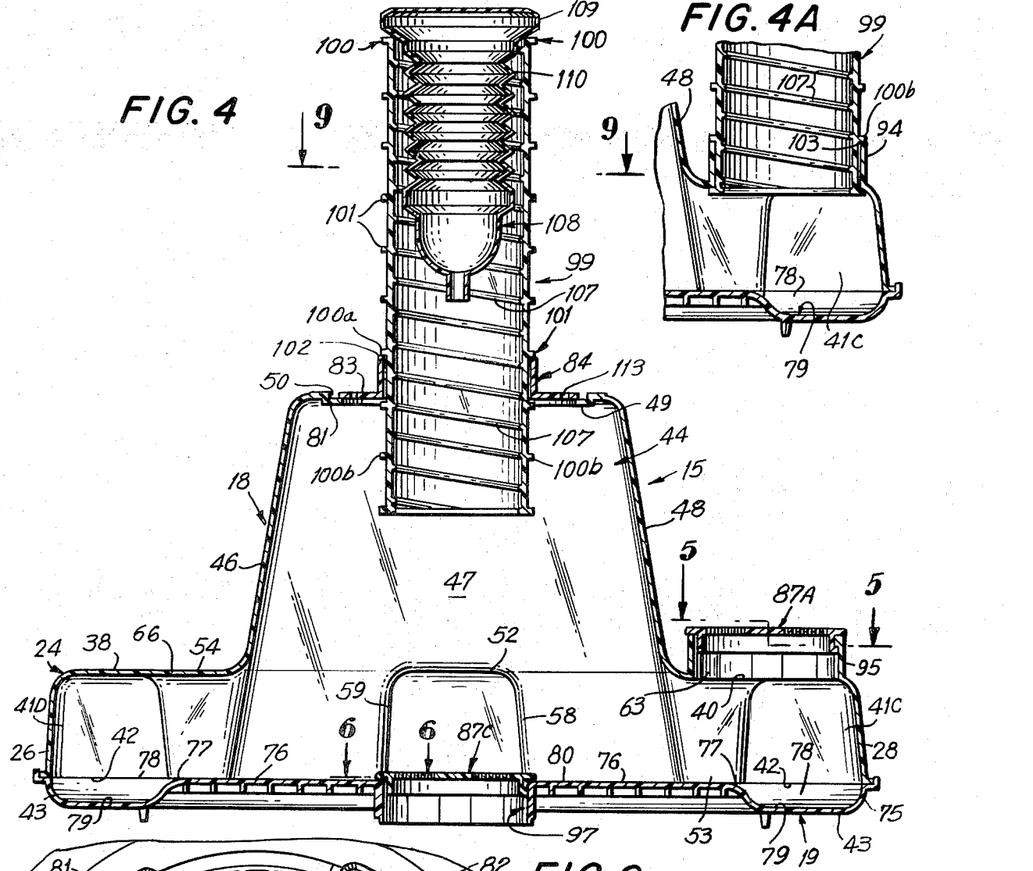
FIG. 4 is a vertical cross section of FIG. 2 taken along line 4—4.
FIG. 4A is a fragmentary vertical section like the right side of FIG. 4 but showing a fragment of the tower positioned at the side of the device, the section taken along 4A—4A of FIG. 2.
Figure 5:
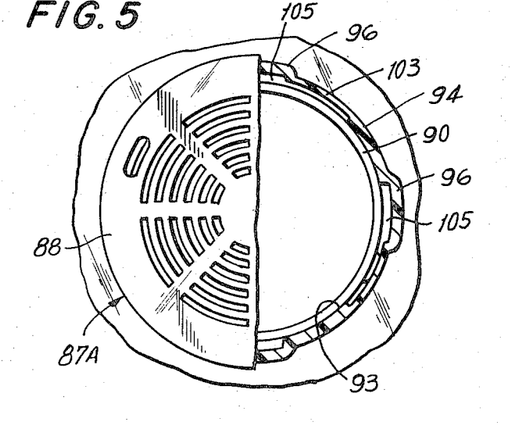
FIG. 5 is an enlarged fragmentary section of FIG. 4 taken along line 5—5.
Figure 6:
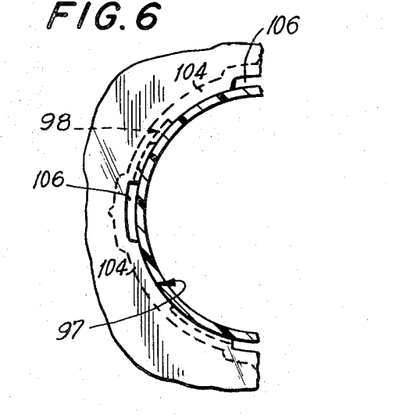
FIG. 6 is an enlarged fragmentary section of FIG. 4 taken along line 6—6.
Figure 7:
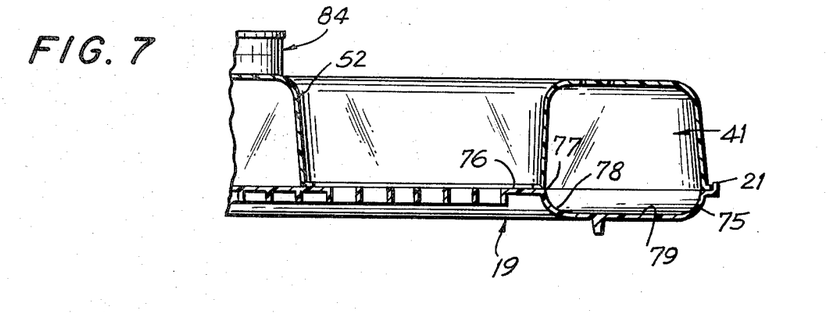
FIG. 7 is a fragmentary section of FIG. 2 taken along line 7—7.
Figure 8:
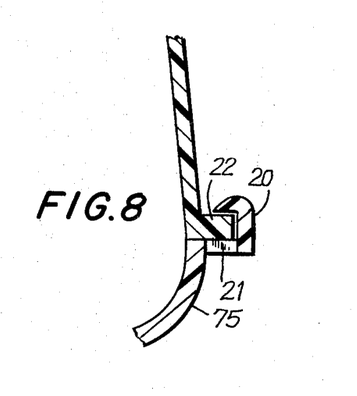
FIG. 8 is an enlarged fragmentary section of FIG. 2 taken along line 8—8.
Figure 9:
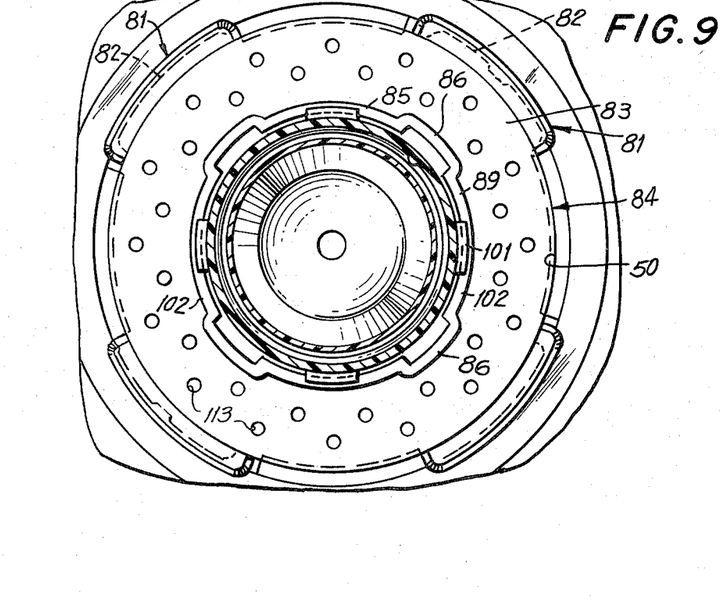
FIG. 9 is an enlarged fragmentary section of FIG. 4 taken along line 9—9.
Figure 10:
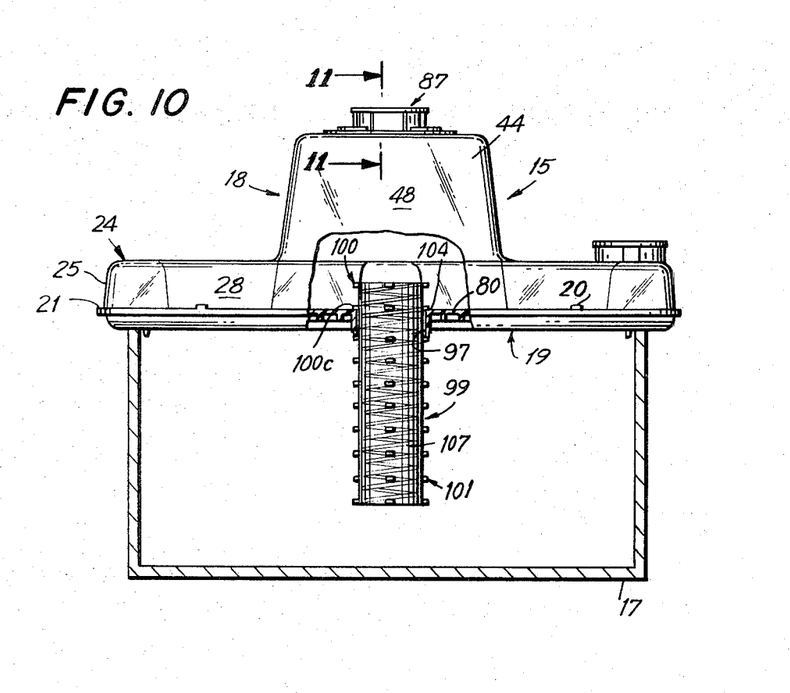
FIG. 10 is a front elevation of the device closed at the top and shown supported by an aquarium tank providing a lower section with the tower extending therein, the tank being shown in section and a portion of the device being broken away for clarity.

The tower 99 is of cylindrical configuration and has a plurality of vertically spaced sets 100, 100a etc. of outwardly extending projections 101, the projections of each set being in the same horizontal plane. The tower is so proportioned and the projections so positioned that a selected set is adapted to rest upon correspondingly positioned inwardly extending bayonet wall edges of any of the selected apertured portions, such as edges 102 of fitting 84, edges 103 of apertured portion 93 and edges 104 of apertured portion 97 of said tray's floor 80. Said projections are of a width sufficient to enable them to move vertically through the spaces between said bayonet edges, such as spaces 105 (FIG. 5) and 106 (FIG. 6), while the tower is being operatively positioned whereafter, upon the rotation of the tower to a position where the projections of a selected set will overlie the said bayonet edges, the tower will be operatively supported in place. For example, by referring to FIG. 4, the set of projections 101 of set 100a is operatively positioned upon the corresponding inwardly extending edges 102 of the fitting 84, whereby a portion of said tower extends downwardly into said central chamber 44; FIG. 4A shows the projections of set 100b positioned on the corresponding bayonet wall edge 103 of annular wall 94; and FIG. 10 shows the projections of set 100c operatively resting upon the wall edges 104 of the tray's apertured portion 97, whereby a portion of said tower now extends downwardly into the underlying tank 17.

On the inner surface of the tower is a helical ledge 107 serving as a ladder for the animal to reach the feeder 108 suspended from the top of the tower. Diametrically opposite portions of said ledge are at height differentials of one-half the pitch of the helix, so that an animal using its laterally opposite legs to climb the tower by grasping the diametrically opposite ledge portions will have its said legs at relatively small height differentials, resulting in less climbing effort than would be exerted in a tower having parallel circumferential ring ledges separated by distances equal to the pitch of the said helical ledge.

The said feeder 108 has an upper flange 109 to which the bellows-like body portion 110 of the liquid container is attached, the said flange 109 being adapted to rest on the upper rim 111 of the tower, whereby the feeder is held operatively suspended within the tower in a suitable selected feeding position (FIG. 4), the feeder at the same time serving as a closure for the tower.

Figure 1:
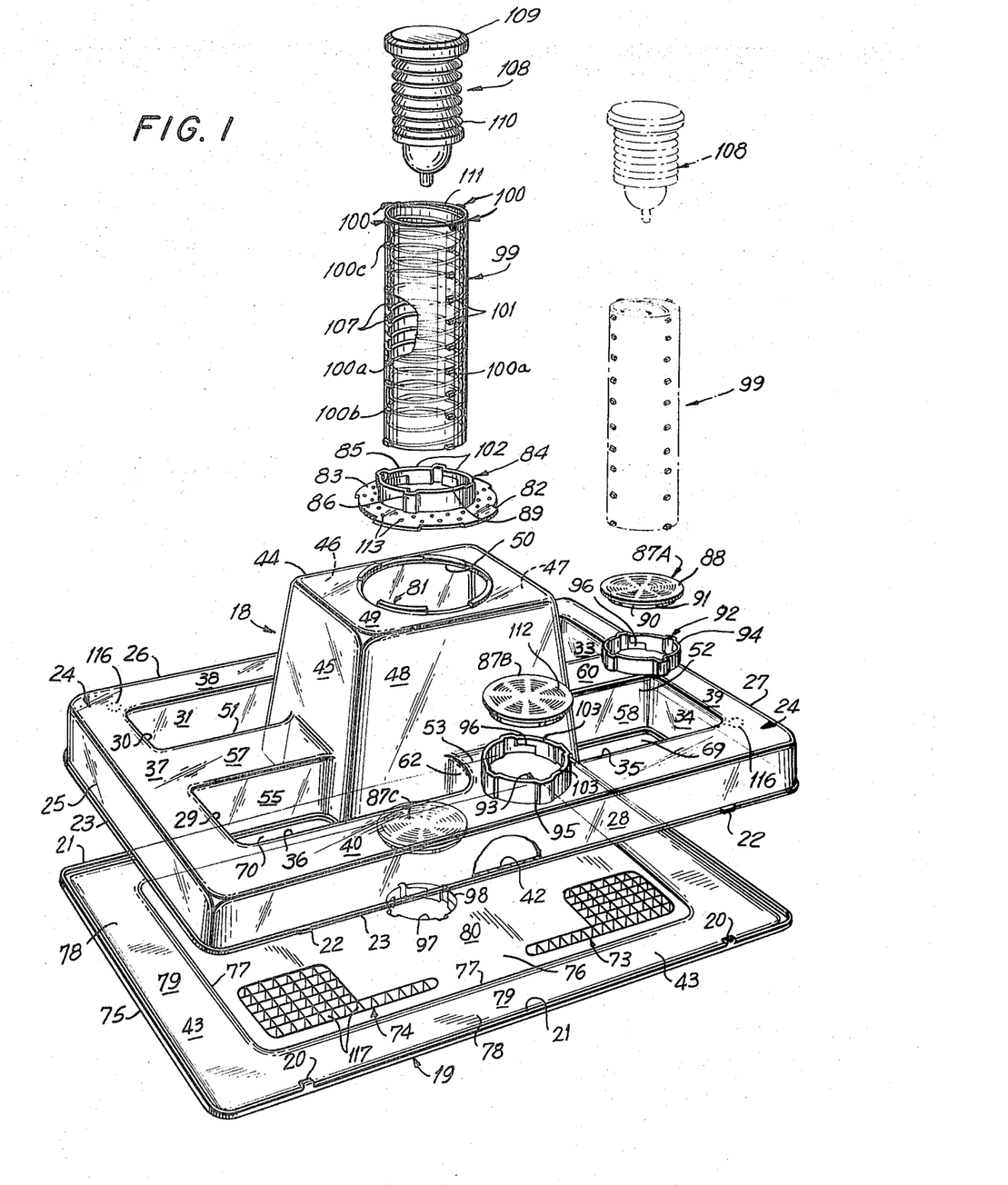
FIG. 1 is an exploded perspective view of the playground device of this invention, showing the tower and feeder components over the central chamber, the broken lines showing said components over a side portion of the device, a portion being broken away for clarity.
Figure 2:
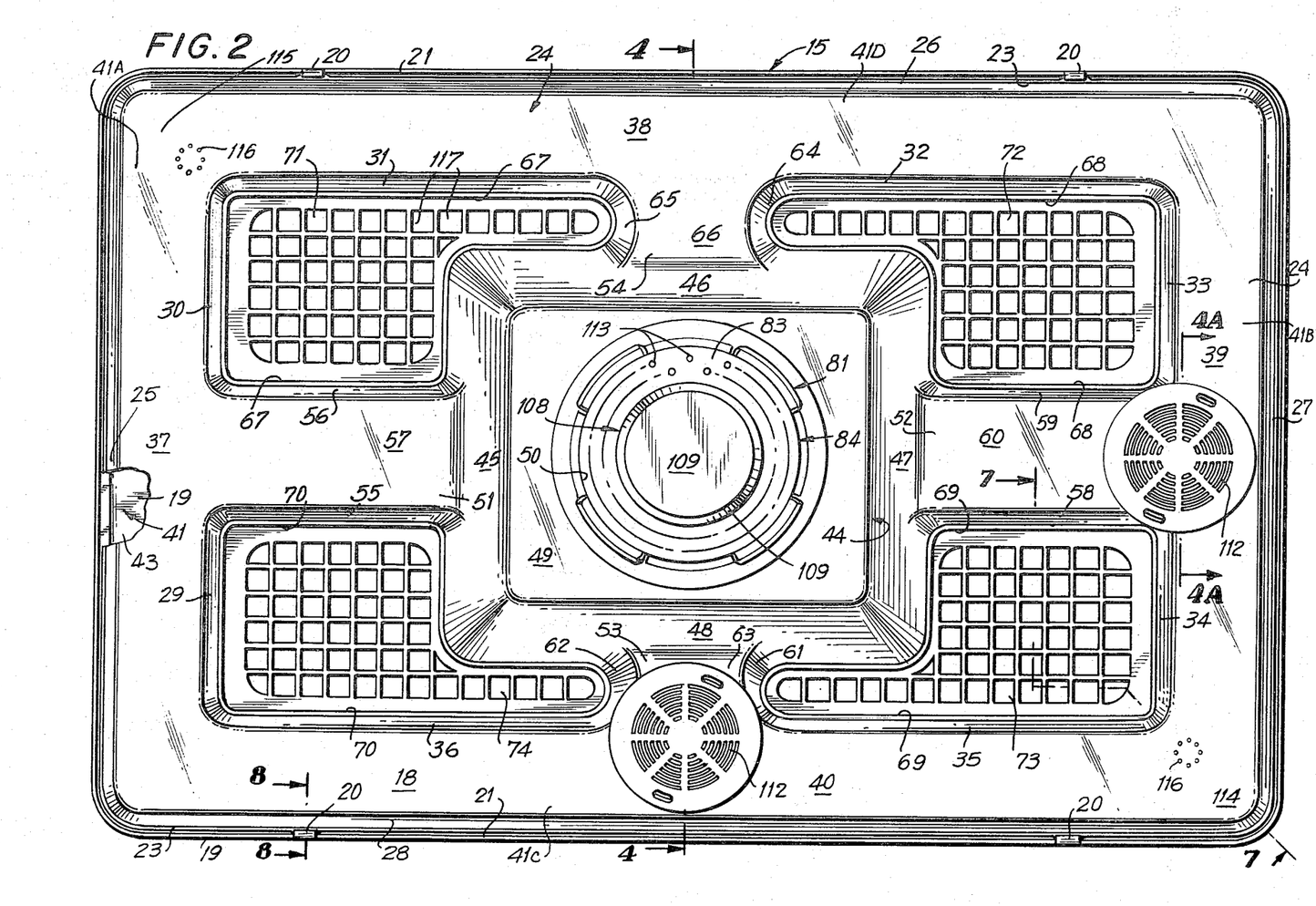
FIG. 2 is a plan view of the device of FIG. 1 with the components in assembled relation, a portion of the main housing unit being broken away for clarity.
Figure 3:
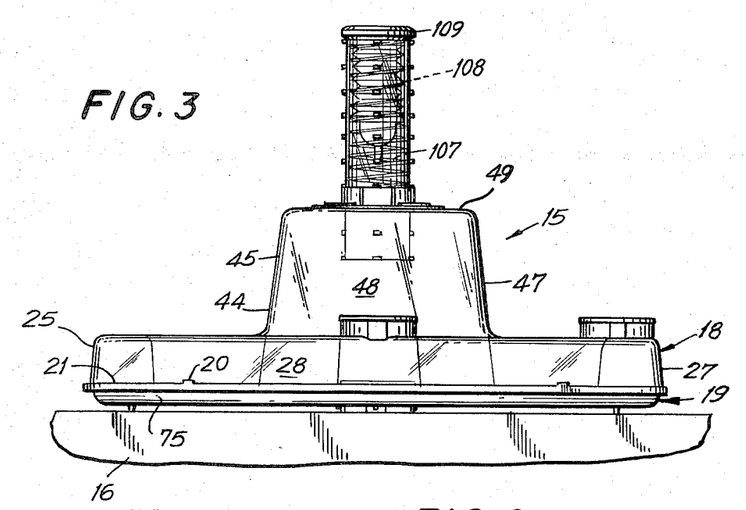
FIG. 3 is a reduced front elevation of FIG. 2 showing the device on a support.

It is thus evident that the tower 99 with the feeder 108 may be operatively connected to the fitting 84, so that the tower will be positioned, as aforesaid, within the central chamber at a desired level, as shown in FIGS. 3 and 4; or it may be attached to one of the apertured portions 92 or 93 above the tunnel, as shown, for example, in FIG. 4A. And it may also be attached to the floor apertured portion 97, (FIG. 10), so that, without the feeder if so desired, it will extend into the lower compartment of the tank 17 when it is desired to use such a tank as an underlying support — thereby providing a passage between the upper and lower sections of this device.

In the use of this device, the solid floor portions 79 of the tunnel 41 and 80 of the central chamber 44 are normally provided with suitable litter. To clean the tray all that need be done is to operatively separate the tray 19 from the main housing number 18, and then readily dispose of the soiled litter.

It is noteworthy that the entire device is provided with suitable ventilating holes to provide air for the confined animals, wherever they may be. Each of the closures 87, 87A and 87B have narrow arcuate slits 112 to admit air, but not wide enough to permit the animal's jaw or claws to extend therethrough. The said flanged fitting 84 has along the flange 83 thereof a plurality of small holes 113, and the corners 114 and 115 of the tunnel each contains a plurality of small holes 116 therein for ventilating purposes. And when the device is placed upon an underlying tank, the apertures 117 in the latticed sections 71, 72, 73 and 74 provide ventilation for the tank therebelow.

It is thus apparent that the entire device offers an extended play area of various configurations and directions, provided with a flat underfooting for convenient and safe movement of the animal. All apertures are closed by suitable closures yet removable when it is desired to insert the tower. Should it be desired to reach into the central chamber 44 to remove an animal for cleansing purposes or for other care, the said fitting 84 is operatively removed and a hand inserted into the central chamber to withdraw the animal. The said apertured portion 50 is closed by said fitting 84 and a closure 87 when the tower is not in place. Due to the fact that there are parts that are detachably connectable, and because of the facility with which the said tower 99 can be placed in different positions, the entire device offers considerable play appeal to children. The adjustable positioning of the tower with or without the feeder therein enables the bottom edge thereof to be located sufficiently close to the animals of different sizes to enter the tower and climb upwardly.

The entire basic unit 15 can be placed upon any supporting surface, such as a table or, if desired, a tank. Where a lower compartment is desired, a conventional aquarium or terrarium can be employed as the supporting structure, and it will be adapted, in the manner above-described, to receive therein the said tower 99, and will be provided with adequate ventilation through the lattice-work vents above-mentioned.

Due to the interchangability and interconnectability of many of the parts, a minimum of components are required to effect a variety of arrangements, thereby resulting in economical production and low cost.

In the above description, the invention has been disclosed merely by way of example and in preferred manner; but obviously many variations and modifications may be made therein. It is to be understood, therefore, that the invention is not limited to any particular form or manner of practicing same.

We claim:

1. A playground housing for small animal pets comprising a basic unit having a transparent main housing member and a base tray thereunder, said member comprising a chamber defined by a plurality of lateral walls and a roof, said chamber being open at the bottom, a main apertured portion in said roof, a peripheral tunnel defined by laterally opposite sides, a roof and a floor, and channel means communicating between said chamber and tunnel, said channel means being defined by laterally opposite walls and a top wall, the bottom portions of said channel means being open, said tray having a portion thereof underlying and constituting the floor of said chamber, the peripheral portions of said tray underlying and constituting the floor of said tunnel, a tower detachably connected to said apertured portion and when connected being in communication with said chamber, said tower having along the inner surface thereof ledge climbing means for the animal, and detachable closure means for said apertured portion.

2. A playground housing a chamber defined by a plurality of lateral walls and a roof, said chamber being open at the bottom a main apertured portion in said roof, a peripheral tunnel defined by laterally opposite sides, a roof and a floor, and channel means communicating between said chamber and tunnel, said channel means being defined by laterally opposite walls and a top wall, the bottom portions of said channel means being open, said tray having a portion thereof underlying and constituting the floor of said chamber, the peripheral portions of said tray underlying and constituting the floor of said tunnel, a tower detachably connected to said apertured portion and when connected being in communication with said chamber, said tower having along the inner surface thereof ledge climbing means for the animal, and detachable closure means for said apertured portion, said housing member having at least one other apertured portion in spaced relation to said main apertured portion and proportioned for releasable operative engagement with said tower, said other apertured portion being disposed in the roof of said tunnel, said apertured portions and said tower having respective coactive detachable supporting means, whereby said tower may be detachably secured to the supporting means of any selected one of said apertured portions for communication with said chamber or tunnel.

3. A playground housing according to claim 2, said tower having outwardly extending sets of circumferentially peripherally spaced projections, said sets being in vertically spaced relation and at different levels, the supporting means of said main apertured portion having walled means proportioned and positioned to receive and support a selected set of said projections, whereby said tower may be adjustably positioned to extend a desired amount into said chamber.

4. A playground housing according to claim 3, said main apertured portion in said chamber comprising a peripheral wall having locking means and defining a laterally enclosed opening, its said detachable supporting means having a flanged fitting with an annular wall and a peripheral flange in releasable interlocking engagmeent with said locking means on said peripheral wall.

5. A playground housing according to claim 2, said tray being detachably secured to said main housing member, said chamber being centrally positioned in said housing member, said channels joining said chamber at medial portions thereof.

6. A playground housing according to claim 5, said floor portions of said tray underlying said central chamber and tunnel being flat, certain other portions of said tray having apertured ventilating sections positioned between said chamber and said peripheral tunnel.

7. A playground housing according to claim 6, and supporting means underlying said tray, said supporting means comprising a laterally enclosed compartment disposed below said chamber and said ventilating sections, said portion of said tray underlying and constituting the floor of said chamber having an apertured portion therein communicating between said chamber and compartment.

8. A playground housing according to claim 7, said floor's apertured portion being proportioned and adapted for releasably receiving and supporting said tower, whereby the tower is in communication with both said chamber and compartment.

9. A playground housing according to claim 8, said floor's apertured portion having at spaced intervals wall portions positioned and proportioned to engage and support a selected set of said tower projections.

10. A playground housing according to claim 2, peripheral portions of said tray forming the floor of said tunnel being disposed below the level of other portions of the tray, thereby to provide a somewhat lower play level for the animals.

11. A playground housing according to claim 7, said apertured portions being provided with interchangeable detachable closure members, said closure members and certain walls of said tunnel having ventilating apertures therein.

12. A playground housing according to claim 7, said apertured ventilating sections being of lattice-work configuration, said main housing member having open portions above said lattice-work, whereby said compartment will be in communication with the atmosphere through the lattice-work apertures.

* * * * *

Dedication 3,865,082.—*David D. Lovitz*, Short Hills, N.J., and *Ness Eastman*, Rego Park, and *William H. Davidson*, Katonah, N.Y. SMALL ANIMAL PLAYGROUND. Patent dated Feb. 11, 1975. Dedication filed Mar. 14, 1977, by the assignee, *The Hartz Mountain Corporation.*

Hereby dedicates to the Public the entire term of said patent.

[*Official Gazette June 7, 1977.*]